US012000371B2

(12) United States Patent
Robson et al.

(10) Patent No.: US 12,000,371 B2
(45) Date of Patent: Jun. 4, 2024

(54) METHOD OF MANUFACTURING A WIND TURBINE BLADE (71) Applicant: Vestas Wind Systems A/S, Aarhus N (DK)

(72) Inventors: Christian David Robson, Newport (GB); John Morgan, Newport (GB); Kieron Lavers, Ryde (GB)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/001,281

(22) PCT Filed: Jun. 10, 2021

(86) PCT No.: PCT/DK2021/050183
§ 371 (c)(1),
(2) Date: Dec. 9, 2022

(87) PCT Pub. No.: WO2021/249605
PCT Pub. Date: Dec. 16, 2021

(65) Prior Publication Data
US 2023/0235724 A1 Jul. 27, 2023

(30) Foreign Application Priority Data

Jun. 11, 2020 (DK) .............................. PA202070372

(51) Int. Cl.
*F03D 1/06* (2006.01)
(52) U.S. Cl.
CPC ........ *F03D 1/0675* (2013.01); *F05B 2230/60* (2013.01); *F05B 2260/30* (2013.01)
(58) Field of Classification Search
CPC .... F03D 1/0679; F03D 1/0681; F03D 1/0682; F03D 1/0684; F05B 2230/60;
(Continued)

(56) References Cited

U.S. PATENT DOCUMENTS 11,306,697 B2 * 4/2022 Girolamo .............. F03D 1/0675
11,644,006 B2 * 5/2023 Cieslak .................... B32B 5/12
416/223 R
(Continued)

FOREIGN PATENT DOCUMENTS

EP 3294532 A1 3/2018
EP 3470198 A1 4/2019

OTHER PUBLICATIONS

International Searching Authority, International Search Report and Written Opinion issued in PCT Application No. PCT/DK2021/050183, mailed Sep. 15, 2021.
(Continued)

*Primary Examiner* — Courtney D Heinle
*Assistant Examiner* — Danielle M. Christensen
(74) *Attorney, Agent, or Firm* — Wood Herron & Evans LLP (57) ABSTRACT

In a first aspect of the invention there is provided a method of making a wind turbine blade. The method comprises providing a blade shell mould, providing a plurality of 5 substantially planar strips of reinforcing material, and arranging the plurality of strips in the mould in a first stack to form at least part of a first spar cap. The method further comprises providing a retaining clip having a substantially planar body and upper and lower flanges projecting transversely to the planar body, wherein the flanges and the body together define a first receiving region on a first side of the retaining clip, and the 10 method further comprises arranging the retaining clip on a side of the first stack such that the strips in the first stack are received in the first receiving region.

15 Claims, 8 Drawing Sheets

(58) Field of Classification Search
CPC . F05B 2260/30; B29C 70/543; B29C 70/682; B29C 70/865; B29D 99/0028
See application file for complete search history.

(56) References Cited

U.S. PATENT DOCUMENTS

| | | |
|---|---|---|
| 2016/0263843 A1 | 9/2016 | Bech et al. |
| 2016/0305399 A1 | 10/2016 | Spandley et al. |
| 2017/0074241 A1 | 3/2017 | Koike |
| 2018/0223797 A1 | 8/2018 | Caruso et al. |
| 2019/0353143 A1* | 11/2019 | Girolamo ........... B29D 99/0025 |

OTHER PUBLICATIONS

Danish Patent and Trademark Office, Examination and Search Report issued in Application No. PA 202070372, dated Dec. 11, 2020.
European Patent Office, Examination Report issued in corresponding EP Application No. 21734276.5, dated Dec. 6, 2023.

* cited by examiner

METHOD OF MANUFACTURING A WIND TURBINE BLADE

TECHNICAL FIELD

The present invention relates generally to wind turbine blades, and more specifically to an improved method for manufacturing wind turbine blades.

BACKGROUND

Modern wind turbine blades typically comprise a shell defining the aerodynamic contour of the blade and one or more longitudinally-extending spars which act as the main load-bearing structures of the blade. A spar typically comprises a shear web connected between opposed spar caps provided respectively on windward and leeward sides of the blade. Spar caps are configured to absorb bending loads experienced by the blade in use and therefore typically comprise a material with a high tensile strength, such as carbon fibre reinforced plastic (CFRP).

In some wind turbine blades, the spar caps comprise a plurality of strips of reinforcing material arranged in a stack. However, when arranged on an inclined mould surface during manufacture of a blade, the strips tend to move relative to one another due to the effect of gravity. Mould surfaces near a root end of the mould can be particularly steep, and correct alignment of reinforcing strips in this area is particularly challenging. The spar caps may alternatively be formed of two or more adjacent stacks of strips to allow the spar caps to conform to the chordwise curvature of the blade. This introduces further challenges during manufacture of the blade in that the strips may butt up against or overlap adjacent strips or stacks.

Misaligned reinforcing strips can be detrimental to the load bearing capacity of a wind turbine blade, and can also cause other blade components arranged adjacent to the spar caps to be positioned incorrectly. The stacks of reinforcing strips can be very heavy, and may in some examples extend over 70 m in length, making them very difficult to handle and reposition once misaligned. Further, the strips typically comprise an inherent elastic resilience due to the tensile nature of the reinforcing material. When the strips are arranged in a mould with complex curved geometry to form a blade shell with an aerodynamic contour, the resilience in the strips can cause them to spring away from one another and in some cases overlap with strips of adjacent stacks.

It is against this background that the present invention has been developed.

SUMMARY OF THE INVENTION

In a first aspect of the invention there is provided a method of making a wind turbine blade. The method comprises providing a blade shell mould, providing a plurality of substantially planar strips of reinforcing material, and arranging the plurality of strips in the mould in a first stack to form at least part of a first spar cap. The method further comprises providing a retaining clip having a substantially planar body and upper and lower flanges projecting transversely to the planar body, wherein the flanges and the body together define a first receiving region on a first side of the retaining clip, and the method further comprises arranging the retaining clip on a side of the first stack such that the strips in the first stack are received in the first receiving region.

The upper flange of the retaining clip preferably engages an upper surface of the first stack. The lower flange of the retaining clip preferably engages a lower surface of the first stack. The first stack preferably abuts a first side of the clip body.

The retaining clip is preferably designed to grip the first stack of strips between the upper and lower flanges. Accordingly, the first and second flanges are preferably spaced apart on the first side of the clip body by a distance substantially corresponding to a height of the first stack. The retaining clip preferably fixes the strips in the stack relative to one another by means of a tight interference fit between the clip and the stack.

With the strips of the first stack in the first receiving region, the body of the clip may be substantially perpendicular to the plane of the strips and may restrict in-plane movement of the strips. The flanges of the clip may respectively overlap the upper and lower strips in the first stack to restrict out of plane movement of the strips.

The step of arranging the plurality of strips in the mould may comprise arranging the strips in first and second side-by-side stacks to form at least part of the first spar cap. The retaining clip may be arranged such that its planar body is between the first and second stacks and maintains a predetermined spacing between the stacks.

The stacks of strips may comprise two or more strips of reinforcing material stacked on top of one another.

The flanges and the body of the retaining clip may together define a second receiving region on a second side of the retaining clip. The method may further comprise arranging the retaining clip on a side of the second stack such that the strips of the second stack are received in the second receiving region.

The upper flange of the retaining clip preferably engages an upper surface of the second stack. The lower flange of the retaining clip preferably engages a lower surface of the second stack. The second stack preferably abuts a second side of the clip body.

The retaining clip is preferably designed to grip the second stack of strips between the upper and lower flanges. Preferably, the first and second flanges are spaced apart on the second side of the clip body by a distance substantially corresponding to a height of the second stack.

With the strips of the second stack in the second receiving region, the body of the clip may restrict in-plane movement of the strips in both stacks. The flanges of the clip may respectively overlap upper and lower strips in each stack and prevent out of plane movement. The retaining clip may therefore retain the strips in their respective stacks and may prevent the strips of one stack moving or sliding to overlap the adjacent stack. The body of the clip may maintain the requisite spacing between the stacks.

In a second aspect of the invention there is provided a wind turbine blade comprising a spar cap comprising a plurality of substantially planar strips of reinforcing material arranged in at least a first stack. The wind turbine blade further comprises a retaining clip having a substantially planar body and upper and lower flanges projecting transversely to the planar body. The flanges and the body together define a first receiving region on a first side of the retaining clip. The retaining clip is arranged on a side of the first stack such that the strips in the first stack are received in the first receiving region.

The spar cap may comprise first and second side-by-side stacks. The planar body of the retaining clip may be arranged between the first and second stacks and may set a predetermined spacing between the stacks.

Preferably the planar body has a thickness corresponding to the predetermined spacing between the stacks. Preferably the thickness of the body is between 0.5 mm and 10 mm, preferably between 0.5 mm and 5 mm, and most preferably between 0.5 mm and 2.5 mm. The spacing defined between adjacent stacks of strips may therefore have a width of between 0.5 mm and 10 mm, preferably between 0.5 mm and 5 mm, and most preferably between 0.5 mm and 2.5 mm.

The flanges and the body of the retaining clip may together define a second receiving region on a second side of the retaining clip. The retaining clip may be arranged on a side of the second stack such that the strips of the second stack are received in the second receiving region.

The retaining clip may be substantially H-shaped in cross-section. The H-shaped cross-sectional shape of the clip may define first and second receiving regions respectively on opposite sides of the planar body. The retaining clip may alternatively have any other suitable shape. For example, the retaining clip may be substantially C-shaped in cross-section. In this case, the retaining clip may define only a single receiving region on one side of the body.

The first and/or the second receiving regions may be open structures. That is the receiving regions are bounded on three sides by the planar body and the upper and lower flanges. Preferably the retaining clip consists of the planar body and the upper and lower flanges.

The retaining clip may have a substantially constant cross-sectional profile along its length. The retaining clip may have a length of between 20 mm and 50 mm.

A plurality of retaining clips may be arranged between the first and second stacks at spaced-apart intervals along the lengths of the stacks. The planar bodies of the retaining clips may each have substantially the same thickness, such that a substantially constant spacing is maintained between the first and second stacks along their entire lengths.

Preferably the retaining clips are arranged at spanwise intervals of between 1.5 m and 4 m, and more preferably between 2 m and 3 m, along each stack.

The first and second stacks may vary in height moving from a root end towards a tip end. A distance between the upper and lower flanges of each retaining clip may substantially correspond to the height of the stacks at the location of the respective clip. The retaining clips may therefore vary in height along the length of the spar cap whilst having bodies of equal thickness to each other.

The upper and/or lower flange may taper in thickness towards its edge(s). The tapered thickness may minimise the step height at the edge of the flange to avoid wrinkles and stress concentrations in the laminate.

The upper and/or lower flange may have a cross-sectional profile that is substantially triangular or shaped as a segment of a circle. Preferably, the upper and/or lower flange is shaped substantially as an isosceles triangle having a vertex angle aligned with the clip body. The vertex angle is preferably greater than 90 degrees and the base angles are preferably less than 45 degrees. Accordingly, the triangular flange may define outer surfaces having a relatively shallow gradient.

The retaining clip may be formed of a polymer material. For example, the retaining clip may be formed of a polymer such as nylon. The retaining clip may be an injection-moulded part. Alternatively, the retaining clip may comprise reinforcing fibres, such as glass fibres. The retaining clip may be formed in a pultrusion process.

The spar cap may be formed of any number of side-by-side stacks. Retaining clips may be arranged between the adjacent stacks to maintain a predetermined spacing between the stacks. The retaining clips also restrict relative movement of the strips, thereby preventing the strips from sliding relative to one another.

The strips of reinforcing material may comprise reinforcing fibres such as glass fibres or carbon fibres. Such reinforcing fibres may be unidirectional fibres. Preferably the strips of reinforcing material comprise reinforcing fibres in a cured resin matrix. Most preferably, the strips are pultrusions comprising unidirectional carbon fibres fixed in a cured polymer resin.

BRIEF DESCRIPTION OF THE DRAWINGS

Embodiments of the present invention will now be described by way of non-limiting example only, with reference to the accompanying figures, in which.

DETAILED DESCRIPTION

Figure 1:
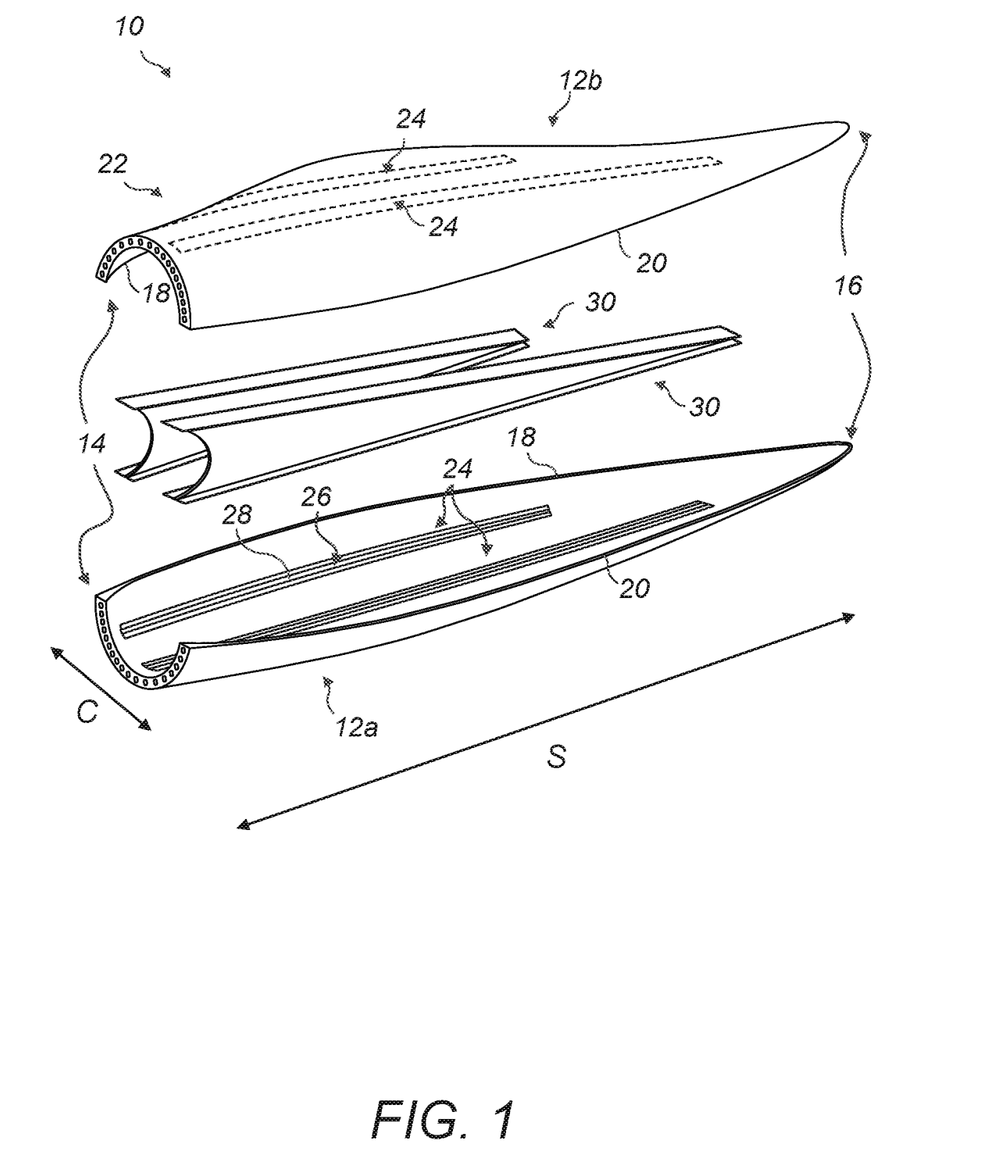
FIG. 1 is a schematic exploded view of a wind turbine blade comprising spar caps formed of a plurality of stacks of strips of reinforcing material arranged side-by-side.

FIG. 1 shows a schematic exploded view of a wind turbine blade 10. The blade 10 comprises a first half shell 12a and a second half shell 12b which each extend in a spanwise direction (S) from a root end 14 of the blade 10 to a tip end 16, and in a chordwise direction (C) between a trailing edge 18 and a leading edge 20. The first and second half shells 12a, 12b are joined together to form a blade shell 22. The blade shell 22 defines an aerodynamic contour and is configured to capture energy from wind incident on the blade 10.

The blade 10 further comprises longitudinally-extending spar caps 24 to take up bending loads experienced by the blade 10 in use. In this example, each half shell 12 comprises two spar caps 24 which are embedded in laminate layers of the half shell 12, forming a so-called structural shell. The spar caps 24 comprise stacks 26 of strips of reinforcing material 28 which are arranged side-by-side and extend longitudinally in the blade 10. The blade 10 further comprises shear webs 30 which are bonded between the mutually-opposed spar caps 24 of the first and second half shells 12a, 12b to form spar structures which provide structural support for the blade 10 in use.

Figure 2:
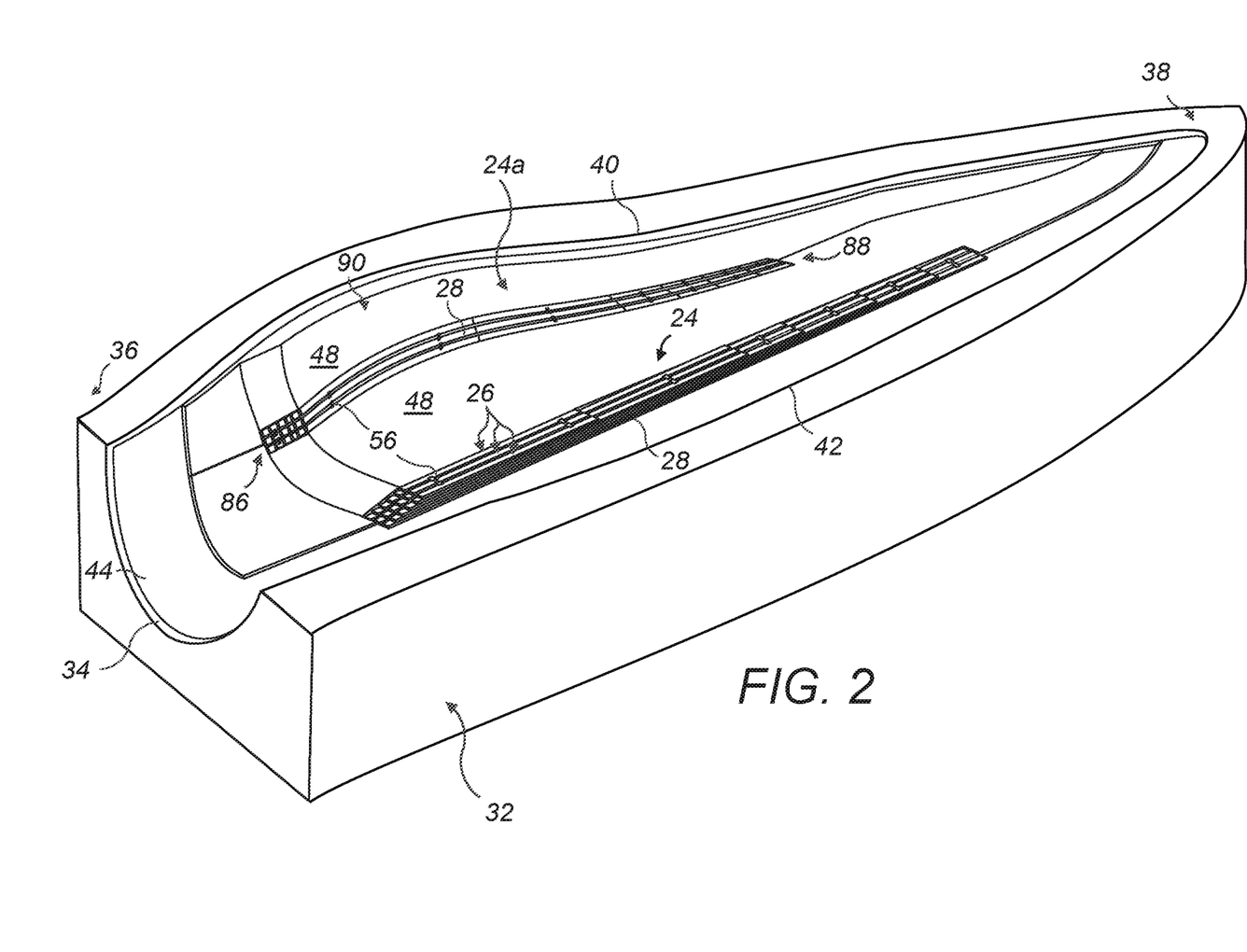
FIG. 2 is a schematic perspective view of a blade shell mould during a lay-up process in the manufacture of the blade.

FIG. 2 shows a stage in the process of forming a half shell 12 during manufacture of the wind turbine blade 10. It will be appreciated that the method of manufacturing the first half shell 12a is substantially the same as the method of manufacturing the second half shell 12b.

Each half shell 12a, 12b in this example is formed in a separate blade shell mould 32 before the half shells 12a, 12b are joined together with adhesive to form the blade shell 22. The mould 32 comprises a mould surface 34 which is concave-curved in cross section, and which is configured to form a half shell 12 with a curved aerodynamic contour. The mould 32 extends longitudinally from a root end 36 to a tip end 38 and transversely between a first longitudinal edge 40 and a second longitudinal edge 42. The mould 32 shown in the example of FIG. 2 is configured to form a leeward half shell 12a, and the first longitudinal edge 40 therefore forms the trailing edge 18 of the half shell 12a, and the second longitudinal edge 42 forms the leading edge 20 of the half shell 12a.

Figure 3A:
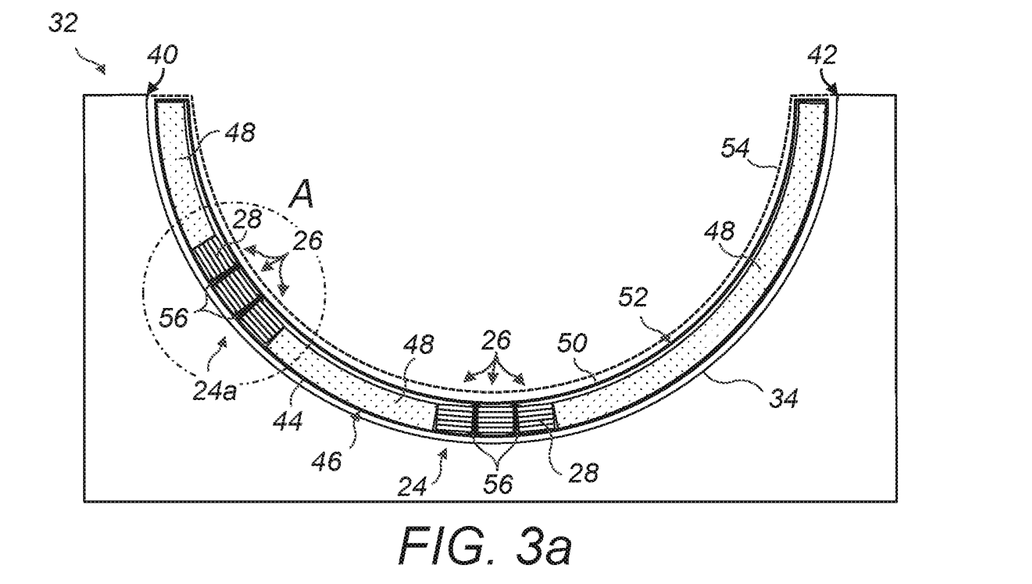
FIG. 3 is a cross-sectional view of the mould following the lay-up process.
Figure 3B:
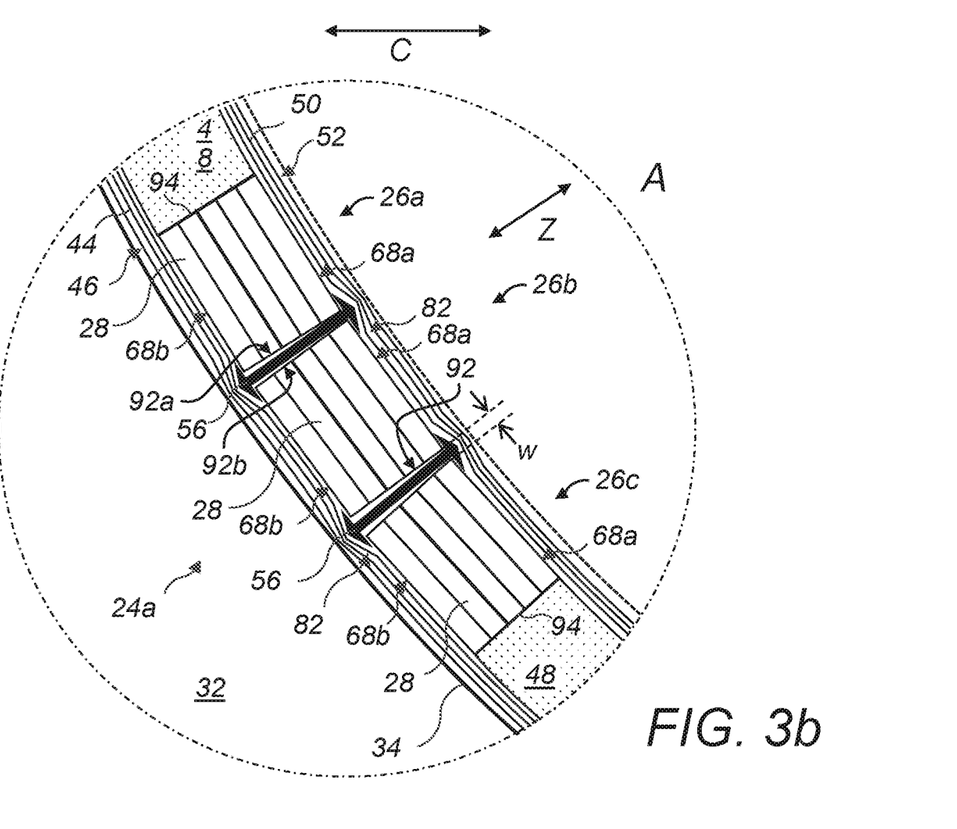

Shell materials are arranged on the mould surface 34 in a lay-up process to form the half shell 12. The half shell 12 in this example is of laminate construction and comprises a plurality of layers as shown most clearly in FIGS. 3a and 3b. FIG. 3a is a cross-sectional view of the mould 32 after the lay-up process is complete and FIG. 3b is a detailed view of a portion A of the cross-sectional view of FIG. 3a. The lay-up process will now be described briefly with reference to FIGS. 2, 3a and 3b.

Reinforcing fibrous material 44 is arranged on the mould surface 34 to form an outer laminate skin 46 of the half shell 12. In this example the fibrous material 44 comprises glass-fibre fabric, for example chopped strand mats (shown most clearly in FIG. 3b). The spar caps 24 are then arranged or assembled in the mould 32 on top of the outer skin layers 44. Each spar cap 24 in this example comprises a plurality of longitudinally-extending strips of reinforcing material 28 arranged in three side-by-side stacks 26. As described later with reference to FIGS. 5 and 6, each spar cap 24 in this example is assembled off-line and arranged in the mould 32 as a sub-assembly to reduce the complexity and time involved in arranging shell materials in the mould 32.

Core material 48 may also be arranged in the mould 32 adjacent to and in-between the spar caps 24 to increase the structural rigidity of the half shell 12. The core material 48 in this example comprises structural foam, such as closed-cell Polyvinylchloride (PVC) foam. The core material 48 is butted up against the spar caps 24 to locate the core material 48 in the mould 32.

Further reinforcing fibrous material 50 is arranged in the mould 32 to form an inner laminate skin 52 of the half shell 12. The inner skin 52 in this example similarly comprises layers of glass-fibre fabric. The inner skin 52 extends over the other shell materials arranged in the mould 32. In this example, a vacuum film 54 is arranged over the inner skin 52 and a vacuum assisted resin transfer moulding (VARTM) process is conducted. The shell materials are thereby infused with resin which cures to integrate the shell materials together. The shell 12 has a sandwich structure in which the core material 48 and spar caps 24 are sandwiched between the inner and outer skins 52, 46. The spar caps 24 are therefore embedded in the shell structure to form a so-called structural shell.

As shown most clearly in FIGS. 3a and 3b, the stacks 26 of strips 28 are held together by a plurality of retaining clips 56 during manufacture of the half shell 12. The clips 56 ensure that the strips 28 in each stack 26 are retained in position relative to one another during manufacture of the shell 12. In this example, the clips 56 also serve to ensure that adjacent stacks 26 are retained in position relative to one another during manufacture of the shell 12. The retaining clips 56 and spar caps 24 in this example will now be described in more detail with reference to FIGS. 3a to 6.

Figure 4:
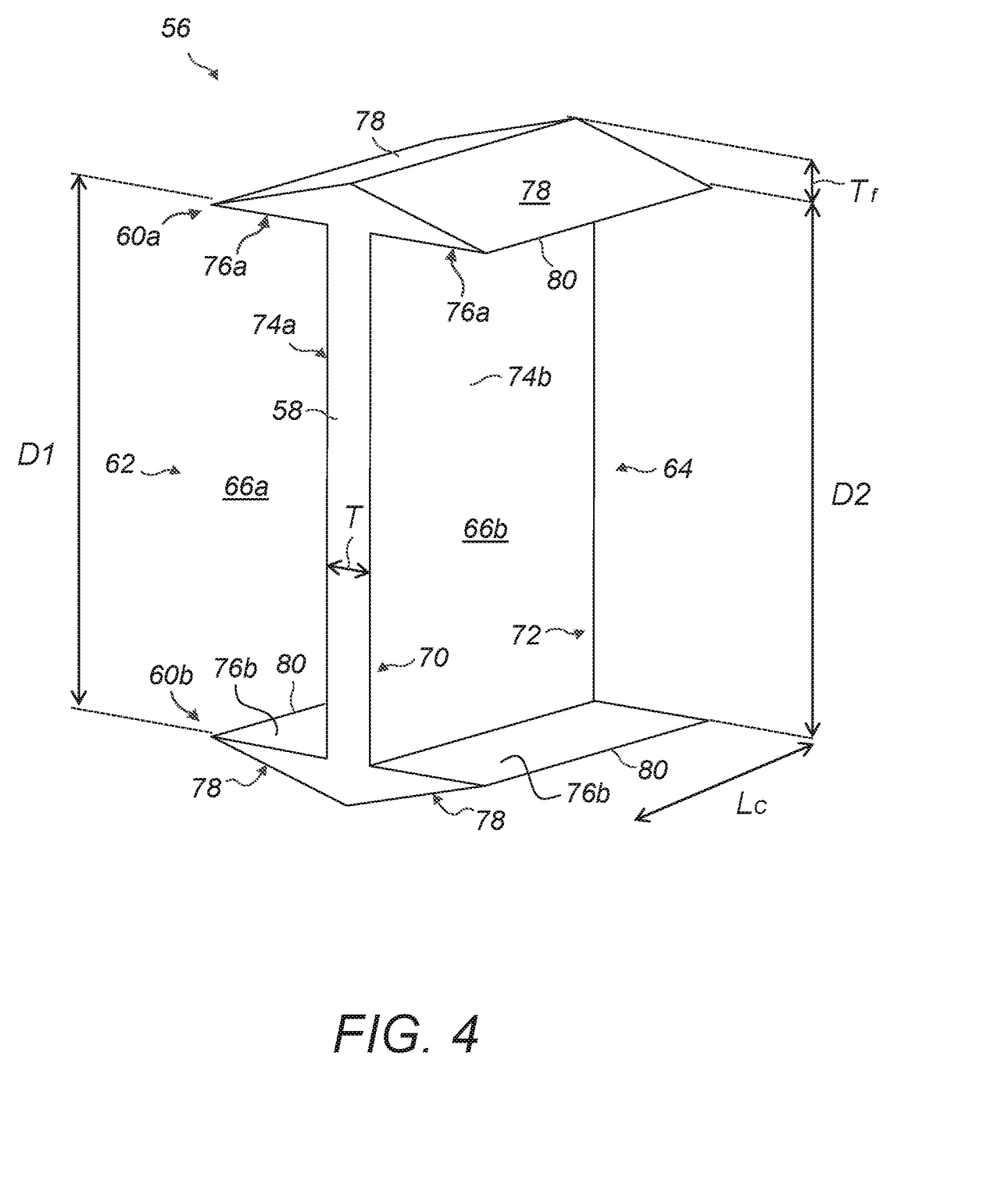
FIG. 4 is a schematic perspective view of a retaining clip used to hold strips of reinforcing material in position relative to one another in a stack.

The retaining clips 56 each comprise a substantially planar body 58 and upper and lower flanges 60a, 60b that project transversely to the clip body 58 (see FIG. 4). In this example, the upper and lower flanges 60a, 60b extend from the clip body 58 on both a first side 62 and a second side 64 of the retaining clip 56. As such, the flanges 60a, 60b and the clip body 58 define a first receiving region 66a on the first side 62 of the retaining clip 56, and a second receiving region 66b on the second side 64 of the retaining clip 56. A first stack 26a of strips 28 is received in the first receiving region 66a. A second, adjacent stack 26b of strips 28 is received in the second receiving region 66b in this example.

The upper and lower flanges 60a, 60b on each side of the retaining clip 56 engage respective upper and lower surfaces 68a, 68b of the first and second stacks 26a, 26b of strips 28. The flanges 60 are configured such that the clip 56 grips the stacks 26 of strips 28 between the opposed flanges 60a, 60b in each of the receiving regions 66a, 66b. Accordingly, on the first side 62 of the retaining clip 56, the upper and lower flanges 60a, 60b are spaced apart by a distance D1 which corresponds substantially to a height h of the first stack 26a at the location of the clip 56. Similarly, in this example the upper and lower flanges 60a, 60b are spaced apart by a distance D2 on the second side 64 of the clip 56 which substantially corresponds to a height h of the second stack 26b of strips 28 at the location of the clip 56.

The retaining clips 56 are configured such that the upper and lower flanges 60a, 60b are substantially parallel to the respective upper and lower surfaces 68a, 68b of each of the first and second stacks 26a, 26b. For example, the retaining clip 56 in the example of FIG. 4 is configured for arrangement in a spanwise location where the upper and lower surfaces 68a, 68b of each of the first and second stacks 26a, 26b are substantially parallel. As such, the distances D1 and D2 between the upper and lower flanges 60a, 60b are substantially constant from a first end of the clip 70 to a second end of the clip 72. The retaining clips 56 in this example are therefore substantially uniform in cross-section from the first end 70 of the clip 56 to the second end 72.

The tight interference fit between a retaining clip 56 and a given stack 26 fixes the strips 28 in the stack 26 relative to one another. In particular the flanges 60a, 60b serve to restrict movement of each strip 28 in an out-of-plane direction Z of each strip 28. As such, the retaining clips 56 ensure that the strips 28 in a stack 26 cannot spring apart in the direction Z when arranged in the mould 32. In this example each clip 56 retains strips 28 in both the first and second adjacent stacks 26a, 26b, thereby also ensuring that the stacks as a whole do not move relative to one another in the out-of-plane direction Z. The retaining clips 56 ensure that the upper surfaces 68a, and lower surfaces 68b, of adjacent stacks are flush, i.e. substantially co-planar, such that there is substantially no step in the out-of-plane direction Z between adjacent stacks 26.

In this example the first and second stacks 26a, 26b of strips 28 are arranged side-by-side and the body 58 of each retaining clip 56 is arranged between the adjacent stacks 26. The planar body 58 of each clip 56 has a thickness T defined between first and second sides 74a, 74b of the body 58 (shown in FIG. 4). The first stack 26a abuts the first side 74a of the clip body 58, and the second stack 26b abuts the second side 74b of the clip body 58. As such, the thickness T of the clip body 58 is configured to maintain a predetermined spacing of width w between the adjacent stacks 26 which is substantially the same as the thickness T of the clip body 58.

For optimal structural performance, the spacing between adjacent stacks 26a, 26b should be small without allowing the stacks 26 and/or strips 28 to clash or overlap. Ensuring the adjacent stacks 26 are spaced apart is further important in order to facilitate a thorough resin infusion throughout the lay-up. The thickness T of the clip body 58, and therefore also the width w of the spacing between the adjacent stacks 26, is 1 mm in this example.

The longitudinally-extending strips of reinforcing material 28 are substantially planar, i.e. flat, elongate components. The planar bodies 58 of the retaining clips 56 are substantially perpendicular to the plane of the strips 28 when the strips are arranged in the first and second stacks 26a, 26b in the first and second receiving regions 66a, 66b of the retaining clip 56. With the stacks 26 abutting the planar bodies 58 of the clips 56, the retaining clips 56 serve to restrict in-plane movement of the strips 28 in a generally chordwise direction (C) such that the stacks 26 and/or strips 28 of each stack 26 do not abut one another, and a predetermined minimum spacing is maintained between the stacks 26.

The upper and lower flanges 60a, 60b comprise inner surfaces 76a, 76b which are mutually opposed, i.e. which face one another (see FIG. 4). The inner surfaces 76a, 76b of the upper and lower flanges 60a, 60b engage the upper and lower surfaces 68a, 68b of each of the adjacent stacks 26a, 26b. Each flange 60 has a thickness $t_f$ defined between the inner surface 76 of the flange 60 and an outer surface 78 of the flange 60, whereby the outer surface 78 of the flange 60 is the opposite surface of a given flange 60 to the respective inner surface 76. The flanges 60 also comprise longitudinal edges 80 which extend in a direction substantially parallel to a longitudinal direction Y of a stack 26 when the stack 26 is received in a receiving region 66 of the retaining clip 56.

In this example, the flanges 60 taper in thickness $t_f$ towards their longitudinal edges 80. The thickness $t_f$ of each flange 60 therefore decreases with distance from the clip body 58. The inner surfaces 76 of the flanges 60 in this example are substantially perpendicular to the clip body 58, and the outer surfaces 78 of the flanges 60 are substantially planar surfaces that are inclined relative to their respective inner surfaces 76. The upper and lower flanges 60a, 60b are therefore substantially triangular in cross section in this example.

The benefit of the tapered flange thickness $t_f$ can be seen most clearly in the detailed cross-sectional view of FIG. 3b. The tapered flanges 60 minimise the height of the step 82 between the upper or lower surface 68a, 68b of a stack 26 and the respective upper or lower flange 60a, 60b of the retaining clip 56. The tapered flanges 60 allow the fibrous material 44, 50 i.e. the outer and inner skins 46, 52 of the half shell 12, to smoothly conform around the spar cap 24 and the retaining clips 56. Kinks or wrinkles in the laminate where the fibrous material 44, 50 transitions from covering a stack 26 of strips 28 to covering a retaining clip 56 are thereby avoided. The tapered flanges 60 therefore minimise stress concentrations in the inner and outer skins 52, 46 of the half shell 12, and minimise the occurrence of resin rich areas devoid of fibrous reinforcing material.

The retaining clips 56 remain embedded in the spar cap 24 even after manufacture of the blade 10 is complete. The retaining clips 56 in this example have a length $L_c$ of 25 mm and are therefore very small in relation to the size of a wind turbine blade 10 and/or the length of the spar cap 24. The retaining clips 56 are not bonded to the stacks 26, and do not interfere with the strips of reinforcing material 28 in any way. Inclusion of the clips 56 in the laminate structure of each half shell 12 therefore has no detrimental effect on the load-bearing capacity of the spar cap 24.

Figure 6:
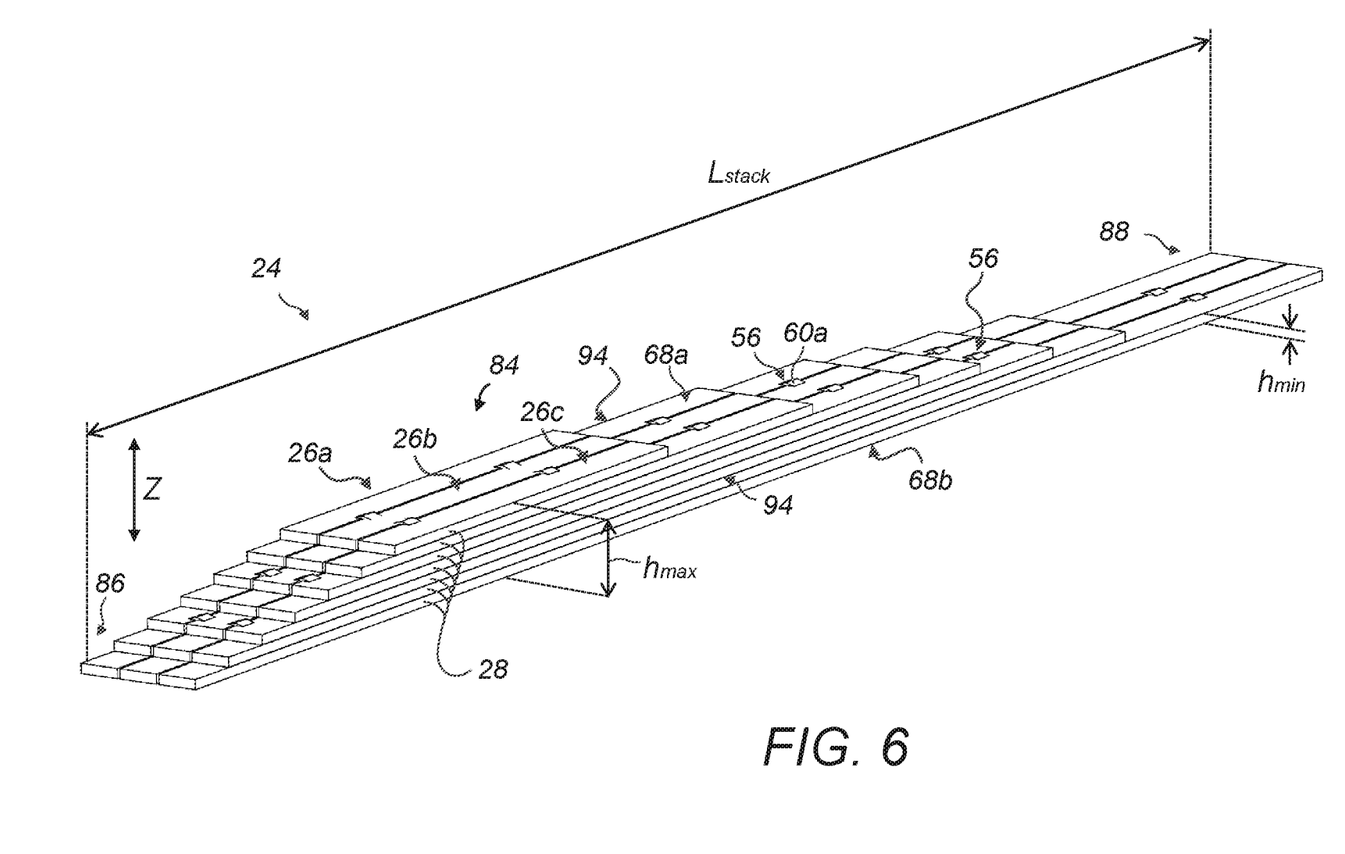
FIG. 6 is a schematic perspective view of a plurality of adjacent stacks of strips and a plurality of retaining clips arranged between adjacent stacks.

The stacks 26 of strips 28 typically have a maximum height $h_{max}$ in a spanwise region wherein the blade 10 requires the most structural support. In this example, the stacks 26 have a maximum height $h_{max}$ in a central portion 84 of the spar cap 24 between a root end 86 and a tip end 88 of the spar cap 24 (as shown in FIG. 6). As such, the stacks 26 in this example comprise a greater number of strips 28 stacked on top of one another in the central portion 84 than near the root end 86 or the tip end 88.

The increased stack height h and/or increased number of strips 28 can make the stacks 26 unstable when arranging the spar cap 24 in the mould 32. The stacks 26 may be particularly unstable in steep areas of the mould 32, such as between a central portion 90 of the mould 32 (shown in FIG. 2) and the root end 36 where the mould surface 34 approximates a semi-circular profile in cross section. As shown in FIGS. 3a and 3b, use of the retaining clips 56 is therefore particularly beneficial in steep areas of the mould 32 to maintain the requisite spacing between the stacks 26 and retain the strips 28 in their respective stacks 26.

With reference to the spar cap 24a nearer to the trailing edge 18 of the half shell 12, arranging retaining clips 56 between the adjacent stacks 26 stops the strips 28 of the first stack 26a sliding chordwise (C) in the mould 32 and clashing with or overlapping the strips 28 of the second stack 26b. Retaining clips 56 arranged between the second stack 26b and a third stack 26c of strips 28 similarly stop strips of the second stack 26b sliding chordwise into the third stack 26c. The retaining clips 56 therefore facilitate accurate alignment of the strips of reinforcing material 28 and maintain a predetermined spacing between the adjacent stacks 26. Accurate alignment of the stacks 26 to form the spar caps 24 further results in accurate positioning of the core material 48 which abuts the spar caps 24 in the mould 32.

Figure 5:
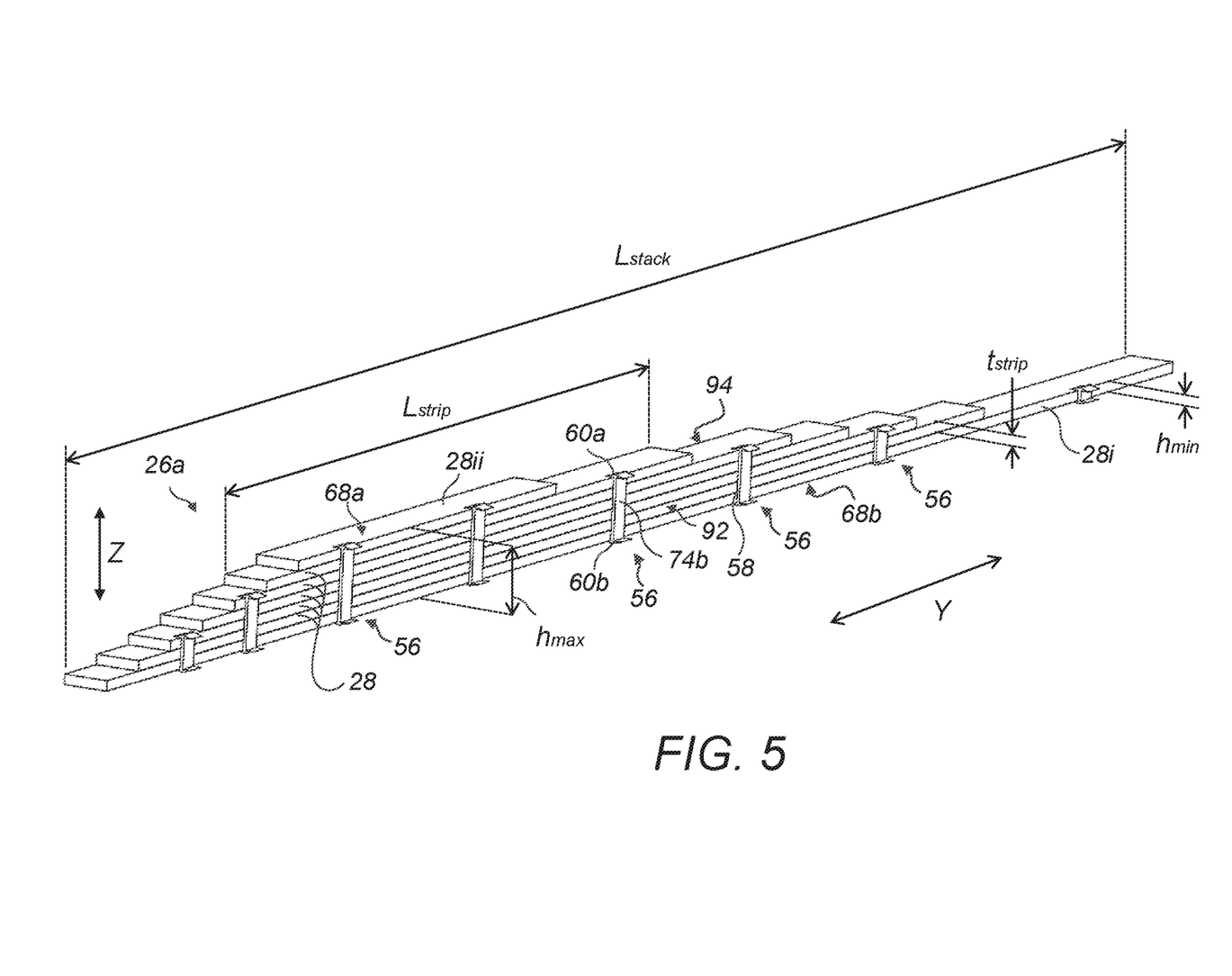
FIG. 5 is a schematic perspective view of a plurality of retaining clips arranged with a first stack of strips.

Referring now primarily to FIGS. 5 and 6, assembling the spar caps 24 in this example involves arranging a plurality of strips of reinforcing material 28 in a first stack of strips 26a. The spar caps 24 in this example are formed of strips 28 having a plurality of different lengths $L_{Strip}$. The strips 28 are arranged such that the height h of the stack 26 progresses from a minimum height $h_{min}$ near the tip end 88 of the spar cap 24 to a maximum height $h_{max}$ in the central portion 84 between the tip end 88 and root end 86 of the spar cap 24. In this example the longest strip 28i is arranged at the bottom of the stack 26 and defines the lower surface 68b of the stack 26. Subsequent strips of reinforcing material 28 are arranged in order of decreasing length $L_{Strip}$, progressing to the shortest strip 28ii arranged at the top of the stack 26 in the central portion 84 where the spar cap 24 has a maximum height $h_{max}$.

Retaining clips 56 are then arranged on a side 92 of the first stack 26a such that the first stack 26a is received in the first receiving region 66a. The upper and lower flanges 60a, 60b on the first side 62 of each clip 56 engage the upper and lower surfaces 68a, 68b of the first stack 26a. The side 92 of the first stack 26a abuts the first side 74a of the body 58 of each retaining clip 56. In this example the retaining clips 56 are spaced apart at intervals of between 2 m and 3 m along the length $L_{Stack}$ of the stack 26.

A plurality of strips of reinforcing material 28 are arranged to form the second stack 26b in this example. The second stack 26b is then arranged adjacent to the first stack 26a such that the second stack 26b is received in the second receiving region 66b of each clip 56. The upper and lower flanges 60a, 60b of the retaining clips 56 engage the respective upper and lower surfaces 68a, 68b of the second stack 26b, and the second stack 26b is brought into abutment with the second side 74b of the clip body 58.

The second stack 26b is therefore arranged side-by-side with the first stack 26a, with the clip body 58 of each retaining clip 56 arranged in between the adjacent stacks 26. In this example, each of the retaining clips 56 comprises a clip body 58 having the same thickness T. The arrangement of retaining clips 56 between the adjacent stacks 26 of strips 28 therefore serves to maintain a spacing of width w between the adjacent stacks 26 which is substantially constant along the entire length $L_{Stack}$ of the stacks 26.

The height h of each stack 26 in this example varies along its length $L_{Stack}$. As previously described, the distance D between the upper and lower flanges 60a, 60b of a given retaining clip 56 is configured to substantially correspond to the height h of the stack 26 retained by the flanges 60a, 60b at a given spanwise location. As such, a plurality of retaining clips 56 are arranged along the length $L_{Stack}$ of the stacks 26, and the retaining clips 56 have different distances D between their respective upper and lower flanges 60a, 60b dependent on the spanwise location of the retaining clip 56. For example, a retaining clip 56 configured for arrangement near the tip end 88 of the spar cap 24 has a smaller distance D between the upper and lower flanges 60a, 60b than a retaining clip 56 configured for arrangement in the central portion 84 of the spar cap 24, where the spar cap 24 has a greater height h.

In this example, assembling the spar cap 24 further comprises arranging a second set of retaining clips 56 with the second stack 26b in the same way as previously described with reference to the arrangement of clips 56 with the first stack of strips 26a. A plurality of strips of reinforcing material 28 are arranged to form the third stack 26c of strips 28, and the third stack 26c is then arranged adjacent to the second stack 26b in the same way as previously described with reference to the first and second stacks 26a, 26b. The clip bodies 58 of the second set of retaining clips 56 again maintain a spacing of substantially constant width w between the second and third stacks 26b, 26c along their length $L_{Stack}$. The retaining clips 56 further ensure that the upper and lower surfaces 68a, 68b of the adjacent second and third stacks 26b, 26c are flush, i.e. substantially coplanar.

The retaining clips 56 arranged between the stacks 26 of strips of reinforcing material 28 serve to maintain the position of the stacks 26 relative to one another during assembly of the half shell 12. The retaining clips 56 remain arranged with the stacks 26 of strips 28 during infusion and curing of the resin to form the half shell 12. The clips 56 therefore also ensure that the strips 28 forming the spar cap 24 remain in alignment with one another throughout the manufacturing process until the cured resin matrix permanently fixes the strips 28 in position as part of the structural shell 22 of the wind turbine blade 10.

In examples wherein the spar cap 24 is assembled off-line, the retaining clips 56 also serve to maintain the position of the stacks 26 relative to one another during transport of the spar cap 24 and arrangement of the spar cap 24 in the mould 32. The use of retaining clips 56 as described herein therefore facilitates a simplified process for manufacturing a half shell 12 of a wind turbine blade 10. Further, accurate alignment of the stacks 26 and reinforcing strips 28 results in a spar cap 24 which provides optimal structural support to the wind turbine blade 10 and minimises the risk of stress concentrations in the blade shell 22.

Figure 7:
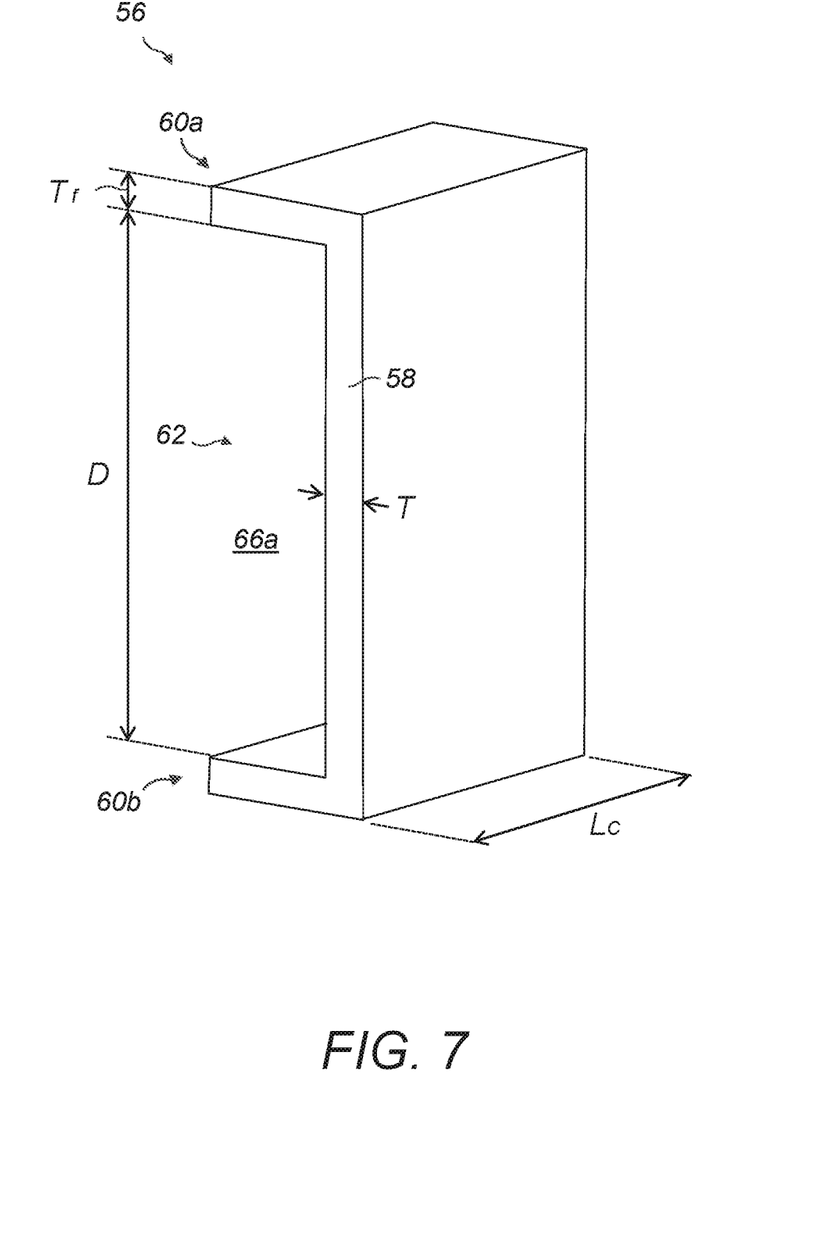
FIG. 7 is a schematic perspective view of a retaining clip that is substantially C-shaped in cross section.

The retaining clips 56 described with reference to the preceding figures are substantially H-shaped in transverse cross section, i.e. the retaining clips 56 comprise upper and lower flanges 60a, 60b which extend on both the first and second sides 62, 64 of the clip 56. However, in other examples, a retaining clip 56 may comprise upper and lower flanges 60a, 60b projecting transversely on only one of the first or second sides 62, 64 of the clip 56 as shown in the example of FIG. 7. Such a retaining clip 56 may be substantially C-shaped in transverse cross section.

The upper and lower flanges 60a, 60b and clip body 58 of the retaining clip 56 in FIG. 7 define a first receiving region 66 on the first side 62 of the clip 56 in which a first stack 26 of strips 28 may be received. The C-shaped retaining clip 56 is configured in substantially the same manner as the H-shaped clips 56 described previously, except that the flanges 60 only extend on one side of the clip 56.

A retaining clip 56 comprising flanges 60 on only one side of the clip 56 may be arranged with a side 94 of a stack 26 which is not adjacent to another stack 26 of strips 28. Clips 56 such as that shown in FIG. 7 may be arranged along a side 94 of an outer stack 26 such as along sides 94 of the first and/or third stacks 26a, 26c in the examples described above. In other examples, H-shaped retaining clips 56, such as that described with reference to FIG. 4, may be arranged along a side 94 of a stack 26 which is not adjacent to another stack 26 of strips 28. Arranging H-shaped or C-shaped retaining clips 56 along sides 94 of the stack 26 which abut the core material 48 in the lay-up helps to minimise the occurrence of any step in the out-of-plane direction Z between the stack 26 and the core material 48 such that the inner and outer skins 52, 46 are smooth and free of wrinkles.

Figure 8A:
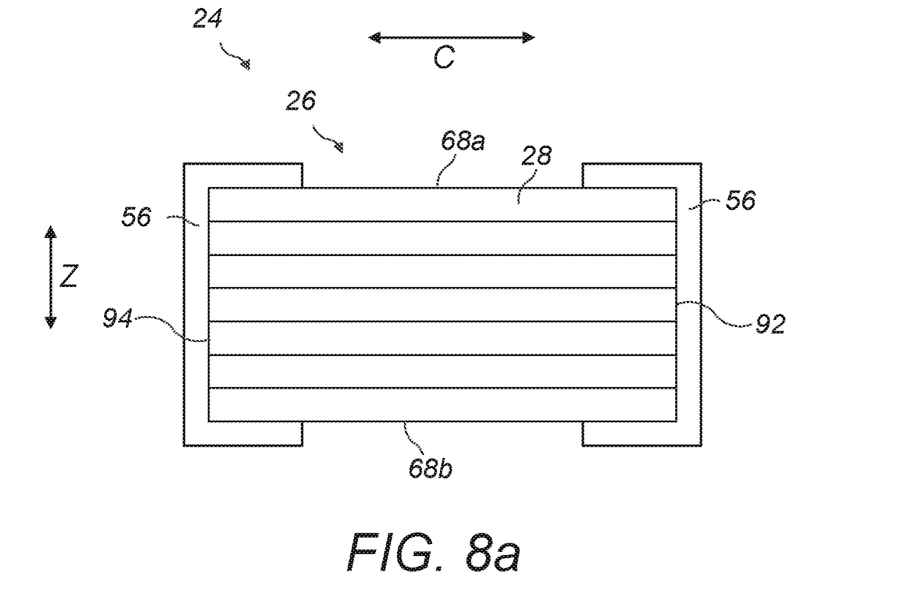
FIG. 8a is a schematic cross-sectional view of a stack of strips comprising C-shaped retaining clips arranged on each side of the stack.

In other examples, a spar cap 24 may be formed of a single stack 26 of strips of reinforcing material 28. In such an example, C-shaped retaining clips 56 such as that shown in FIG. 7 may be arranged along both first and second sides 92, 94 of the stack 26 of strips 28 as shown in FIG. 8a. The stack 26 shown in FIG. 8a may alternatively be a first stack 26a of a plurality of side-by-side stacks 26 of strips 28 that form a spar cap 24. In such an example, the strips 28 in each stack 26 are retained in position relative to one another, but the stacks 26 are not constrained relative to each other by the clips 56 in the out-of-plane direction Z.

Figure 8B:
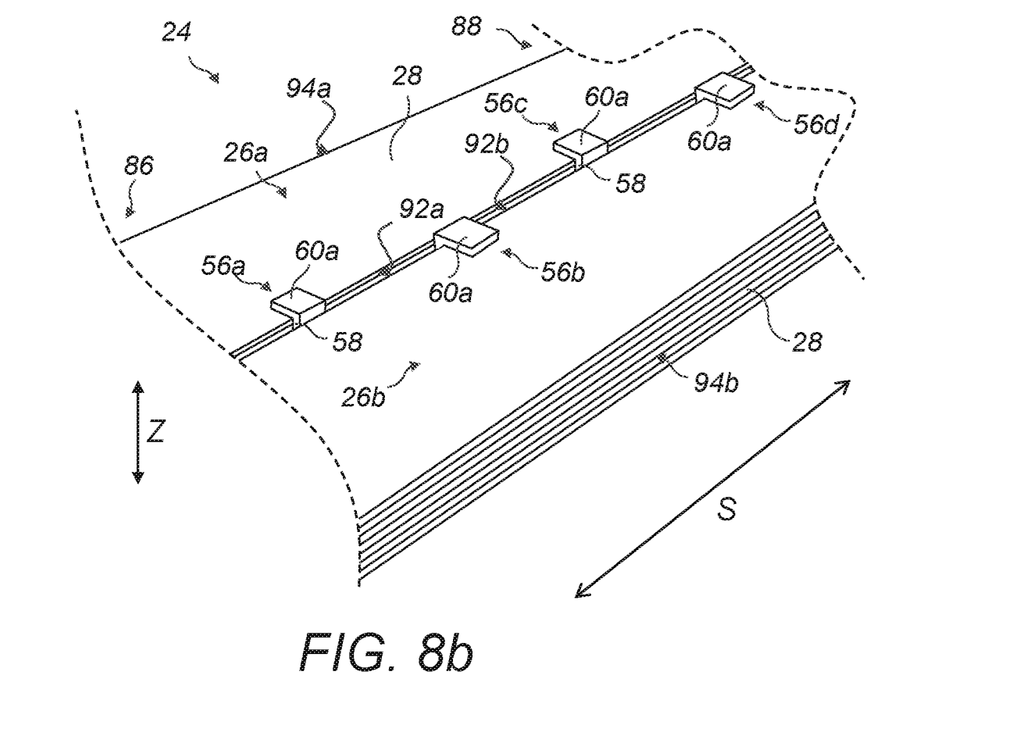
FIG. 8b is a schematic perspective view of two adjacent stacks of reinforcing strips wherein the strips of each stack are held in position by a plurality of C-shaped retaining clips.

FIG. 8b shows a further example wherein each stack 26 of strips 28 is retained by a plurality of C-shaped retaining clips 56. The spar cap 24 in the example of FIG. 8b comprises retaining clips 56 arranged along the adjacent sides 92a, 92b of the first and second stacks 26a, 26b such that the body 58 of each clip 56 is arranged between the adjacent stacks 26. Retaining clips 56 arranged with the first stack 26a and retaining clips 56 arranged with the second stack 26b may be offset in the spanwise direction (S) such that the orientation of the clips 56 alternates from one clip to the next going from the root end 86 to the tip end 88 of the spar cap 24. As shown in FIG. 8b, a first clip 56a may retain the first stack 26a, a second clip 56b may retain the second stack 26b, a third clip 56c may retain the first stack 26a, and a fourth clip 56d may retain the second stack 26b and so on. The clip bodies 58 in such an example serve to maintain a predetermined spacing between the adjacent stacks 26 whilst the flanges 60a, 60b of the clips 56 fix the strips 28 in each stack 26 in position relative to one another.

In yet other examples, retaining clips 56 having flanges 60 on only one side of the clip 56 may additionally or alternatively be arranged with root and/or tip end surfaces of a stack 26 of strips 28 so as to restrict the movement of strips 28 in a stack 26 in the spanwise direction (S) relative to one another.

The retaining clips 56 in the examples described above are formed of a polymer material. For example, the clips 56 may be formed of materials such as nylon of Acrylonitrile butadiene styrene (ABS). Forming the retaining clips 56 of a polymer material facilitates cost-effective manufacture of the clips 56 using processes such as injection moulding or extrusion. Alternatively, the retaining clips 56 may be formed of any other suitable material. For example, the retaining clips 56 may be formed of a composite material comprising reinforcing fibres in a polymer resin. Retaining clips 56 in such an example may be formed by pultrusion or lamination.

The strips of reinforcing material 28 in the examples described herein comprise reinforcing fibres in a cured resin matrix. Preferably, a high percentage of the fibres in each strip 28 extend longitudinally, i.e. in the spanwise direction (S), to take up the bending loads experienced by the blade 10 in use. The strips 28 in the examples described above comprise unidirectional carbon fibres. The strips 28 may be formed in a pultrusion process in which the reinforcing fibres are coated in resin and pulled through a die as the resin is cured. As such, the strips of reinforcing material 28 in the examples described herein are carbon fibre reinforced plastic (CFRP) pultrusions.

Many modifications may be made to the examples described above without departing from the scope of the present invention as defined in the accompanying claims.

In the examples described above, each individual strip of reinforcing material 28 has a substantially constant thickness $t_{Strip}$ along its length $L_{Strip}$, and the height h of the stack 26 varies in a stepwise manner (see FIG. 5 for example). As such, the upper and lower surfaces 68a, 68b of the stacks 26 are substantially parallel at each spanwise location along the spar cap 24 and each retaining clip 56 has a substantially constant distance D between its respective upper and lower flanges 60a, 60b from the first end 70 of the clip 56 to the second end 72. However, in some examples, one or more of the stacks 26 of strips 28 forming a spar cap 24 may taper in height h smoothly, i.e. not in a stepwise manner.

End portions of the strips 28 may be chamfered such that the upper surface 68a of the stack 26 tapers smoothly, i.e. the individual strips 28 may comprise a tapering thickness $t_{Strip}$ near the root end 86 and/or the tip end 88 of the spar cap 24. As such, in some examples, the retaining clips 56 configured for arrangement in a tapered region of the spar cap 24 may comprise divergent upper and lower flanges 60a, 60b. In such an example, a change in distance D between the flanges 60 going from the first end 70 to the second end 72 of the clip 56 preferably corresponds to the tapering height h of a respective stack 26 in the location of the clip 56.

In some examples, the distance D1 between the upper and lower flanges 60a, 60b on the first side 62 of the clip 56 may be different to the distance D2 between the flanges 60a, 60b on the second side 64 of the retaining clip 56. Such a retaining clip 56 may for example be arranged in a spanwise location wherein the first stack 26a of strips 28 has a greater height h than the second stack 26b.

In some examples wherein the thickness $t_f$ of the flanges 60 decreases, the flange thickness $t_f$ may not decrease linearly with distance from the clip body 58. The outside surfaces 78 of the flanges 60 may therefore not be substantially planar inclined surfaces, but may instead be curved surfaces. In such an example, the upper and/or lower flanges 60a, 60b may have a cross-sectional profile that is shaped as a segment of a circle.

In some examples, the spar cap 24 may comprise one or more layers of fibrous material or flow enhancing medium between the stacked strips 28. Especially in examples where the strips 28 are cured parts, e.g. CFRP pultrusions, arranging such layers between strips 28 in a given stack 26 may help to ensure a thorough infusion of resin throughout the shell materials in the mould 32 in order to integrate the lay-up completely.

In some examples, strips of reinforcing material 28 may be arranged with the retaining clips 56 individually, i.e. forming the stack 26 of strips 28 at the same time as arranging the stack 26 with the retaining clips 56. In such an example, the bottom strip 28i of the stack 26 of strips 28 is preferably arranged with the retaining clip 56 first, such that the lower flange 60b engages a bottom surface of the strip 28i. The remaining strips 28 can then be arranged with the clip 56, on top of the bottom strip 28, to form the stack 26. Due to the tight interference fit between the retaining clips 56 and the stacks 26, arranging one or more of the strips 28 with the retaining clip 56 separately may facilitate a simpler assembly process in some examples.

In some other examples the spar cap 24 may not be assembled off-line as a sub-assembly, and may instead be assembled in the mould 32 during the lay-up process. The process for assembling the spar cap 24 is substantially the same whether the spar cap 24 is assembled in the mould 32 or off-line, and the description provided above with reference to FIGS. 5 and 6 therefore applies equally to the assembly of a spar cap 24 in a mould 32.

It will be appreciated that features described in relation to each of the examples above may be readily combined with features described with reference to other examples without departing from the scope of the invention as defined by the following claims.

The invention claimed is:

1. A method of making a wind turbine blade, the method comprising
   providing a blade shell mould;
   providing a plurality of substantially planar strips of reinforcing material;
   arranging the plurality of strips in the mould in a first stack to form at least part of a first spar cap;
   providing a retaining clip having a substantially planar body and upper and lower flanges projecting transversely to the planar body, the flanges and the body together defining a first receiving region on a first side of the retaining clip, wherein the first receiving region is open on the first side of retaining clip in a direction of the upper and lower flanges; and
   arranging the retaining clip on a side of the first stack such that the strips in the first stack are received in the first receiving region.

2. The method of claim 1, wherein the step of arranging the plurality of strips in the mould comprises arranging the strips in first and second side-by-side stacks to form at least part of the first spar cap, and wherein the retaining clip is arranged such that its planar body is between the first and second stacks and maintains a predetermined spacing between the stacks.

3. The method of claim 2, wherein the flanges and the body of the retaining clip together define a second receiving region on a second side of the retaining clip, and the method further comprises arranging the retaining clip on a side of the second stack such that the strips of the second stack are received in the second receiving region.

4. A wind turbine blade comprising:
  a spar cap comprising a plurality of substantially planar strips of reinforcing material arranged in at least a first stack; and
  a retaining clip having a substantially planar body and upper and lower flanges projecting transversely to the planar body, the flanges and the body together defining a first receiving region on a first side of the retaining clip, wherein the first receiving region is open on the first side of retaining clip in a direction of the upper and lower flanges;
  wherein the retaining clip is arranged on a side of the first stack such that the strips in the first stack are received in the first receiving region.

5. The wind turbine blade of claim 4, wherein the spar cap comprises first and second side-by-side stacks, and wherein the planar body of the retaining clip is arranged between the first and second stacks and sets a predetermined spacing between the stacks.

6. The wind turbine blade of claim 5, wherein the flanges and the body of the retaining clip together define a second receiving region on a second side of the retaining clip, and the retaining clip is arranged on a side of the second stack such that the strips of the second stack are received in the second receiving region.

7. The wind turbine blade of claim 5, wherein a plurality of retaining clips are arranged between first and second stacks at spaced-apart intervals along the lengths of the stacks, and wherein the planar bodies of the retaining clips each have substantially the same thickness, such that a substantially constant spacing is maintained between the first and second stacks along their entire lengths.

8. The wind turbine blade of claim 7, wherein the first and second stacks vary in height moving from a root end towards a tip end, and wherein a distance between the upper and lower flanges of each retaining clip substantially corresponds to the height of the stacks at the location of the respective clip.

9. The wind turbine blade of claim 4, wherein the retaining clip is substantially H-shaped in cross-section.

10. The wind turbine blade of claim 4, wherein the retaining clip has a length of between 20 mm and 50 mm.

11. The wind turbine blade of claim 4, wherein the upper and/or lower flange tapers in thickness towards its edge(s).

12. The wind turbine blade of claim 4, wherein the upper and/or lower flange has a cross-sectional profile that is substantially triangular or shaped as a segment of a circle.

13. The wind turbine blade of claim 4, wherein the retaining clip is formed of a polymer material.

14. The wind turbine blade of claim 4, wherein the retaining clip is an injection-moulded part.

15. The wind turbine blade of claim 4, wherein the retaining clip is substantially C-shaped in cross-section.

* * * * *